United States Patent
Bevis et al.

(10) Patent No.: US 11,183,377 B2
(45) Date of Patent: Nov. 23, 2021

(54) MASS SPECTROMETER DETECTOR AND SYSTEM AND METHOD USING THE SAME

(71) Applicant: NOVA MEASURING INSTRUMENTS, INC., Santa Clara, CA (US)

(72) Inventors: Christopher F. Bevis, Los Gatos, CA (US); Yungman Alan Liu, Sunnyvale, CA (US); David Allen Reed, Belmont, CA (US); Eli Cheifetz, Ramat Gan (IL); Amit Weingarten, Ramat Gan (IL); Alexander Kadyshevitch, Tel Aviv (IL)

(73) Assignee: NOVA MEASURING INSTRUMENTS, INC., Santa Clara, CA (US)

( * ) Notice: Subject to any disclaimer, the term of this patent is extended or adjusted under 35 U.S.C. 154(b) by 84 days.

(21) Appl. No.: 16/612,697

(22) PCT Filed: May 12, 2017

(86) PCT No.: PCT/US2017/032447
§ 371 (c)(1),
(2) Date: Nov. 11, 2019

(87) PCT Pub. No.: WO2018/208318
PCT Pub. Date: Nov. 15, 2018

(65) Prior Publication Data
US 2020/0066502 A1 Feb. 27, 2020

(51) Int. Cl.
*H01J 49/02* (2006.01)
*H01J 49/06* (2006.01)
(Continued)

(52) U.S. Cl.
CPC .......... *H01J 49/025* (2013.01); *G01T 1/2006* (2013.01); *G01T 1/208* (2013.01);
(Continued)

(58) Field of Classification Search
CPC .. H01J 49/025; H01J 49/06; H01J 2237/2445; H01J 49/30; G01T 1/28; G01T 1/2928; G01T 1/208; G01T 1/2006
See application file for complete search history.

(56) References Cited

U.S. PATENT DOCUMENTS 3,522,428 A 8/1970 Powers
3,946,227 A * 3/1976 Bingham .............. H01J 49/025
250/281
(Continued)

FOREIGN PATENT DOCUMENTS

EP 0081371 A2 12/1982
EP 2297763 A2 3/2011
(Continued)

OTHER PUBLICATIONS

Transmittal of the International Search Report and Written Opinion of the International Searching Authority dated Jan. 22, 2018, for PCT/US2017/032447, filed May 12, 2017, 11 pages.
(Continued)

*Primary Examiner* — Marcus H Taningco
(74) *Attorney, Agent, or Firm* — Womble Bond Dickinson (US) LLP; Joseph Bach, Esq.

(57) ABSTRACT

An ion detector for secondary ion mass spectrometer, the detector having an electron emission plate coupled to a first electrical potential and configured to emit electrons upon incidence on ions; a scintillator coupled to a second electrical potential, different from the first electrical potential, the scintillator having a front side facing the electron emission plate and a backside, the scintillator configured to emit
(Continued)

photons from the backside upon incidence of electrons on the front side; a lightguide coupled to the backside of the scintillator and confining flow of photons emitted from the backside of the scintillator; and a solid-state photomultiplier coupled to the light guide and having an output configured to output electrical signal corresponding to incidence of photons from the lightguide. A SIMS system includes a plurality of such detectors movable arranged over the focal plane of a mass analyzer.

19 Claims, 5 Drawing Sheets

(51) Int. Cl.
    *G01T 1/20*     (2006.01)
    *G01T 1/208*     (2006.01)
    *G01T 1/29*     (2006.01)
    *G01T 1/28*     (2006.01)

(52) U.S. Cl.
    CPC .............. *G01T 1/28* (2013.01); *G01T 1/2928* (2013.01); *H01J 49/06* (2013.01); *H01J 2237/2445* (2013.01)

(56) References Cited

U.S. PATENT DOCUMENTS

| | | | | |
|---|---|---|---|---|
| 5,055,696 A | * | 10/1991 | Haraichi | H01J 37/228 250/492.2 |
| 5,463,218 A | * | 10/1995 | Holle | H01J 49/025 250/281 |
| 6,297,501 B1 | | 10/2001 | Merren | |
| 6,303,932 B1 | * | 10/2001 | Hamamura | H01J 37/28 250/397 |
| 8,890,086 B1 | * | 11/2014 | Goldberg | H01J 49/025 250/397 |
| 2004/0061054 A1 | | 4/2004 | Kondo et al. | |
| 2004/0149900 A1 | | 8/2004 | Makarov et al. | |
| 2011/0095177 A1 | * | 4/2011 | Giannakopulos | H01J 49/025 250/282 |
| 2011/0291010 A1 | | 12/2011 | Katane et al. | |
| 2013/0234032 A1 | * | 9/2013 | Wang | G01T 1/20 250/368 |
| 2013/0268212 A1 | | 10/2013 | Makarov et al. | |
| 2015/0162174 A1 | * | 6/2015 | Badiei | H01J 49/0009 250/288 |

FOREIGN PATENT DOCUMENTS

| | | |
|---|---|---|
| EP | 2518755 A1 | 10/2012 |
| GB | 2036140 A | 6/1980 |
| GB | 2249426 A | 5/1992 |
| JP | 61248345 A | 11/1986 |
| JP | H08201342 A | 8/1996 |
| JP | 2005207955 A | 8/2005 |
| JP | 2009080124 A | 4/2009 |
| JP | 2010272525 A | 12/2010 |
| JP | 2012049110 A | 3/2012 |
| JP | 2012230902 A | 11/2012 |
| JP | 2013508905 A | 3/2013 |
| JP | 2016024941 A | 2/2016 |
| WO | 2009144727 A2 | 12/2009 |
| WO | 2011048061 A2 | 4/2011 |
| WO | 2016130690 A1 | 8/2016 |

OTHER PUBLICATIONS

Transmittal of International Preliminary Report on Patentability dated Nov. 12, 2019, for PCT/US2017/032447, filed May 12, 2017, 7 pages.

Supplementary European Search Report from related EP Application No. 17909522.9 dated Oct. 30, 2020 (9 pages).

Japanese Office Action from related JP Application No. 2019-562588 dated May 11, 2021 (15 pages including translation).

\* cited by examiner

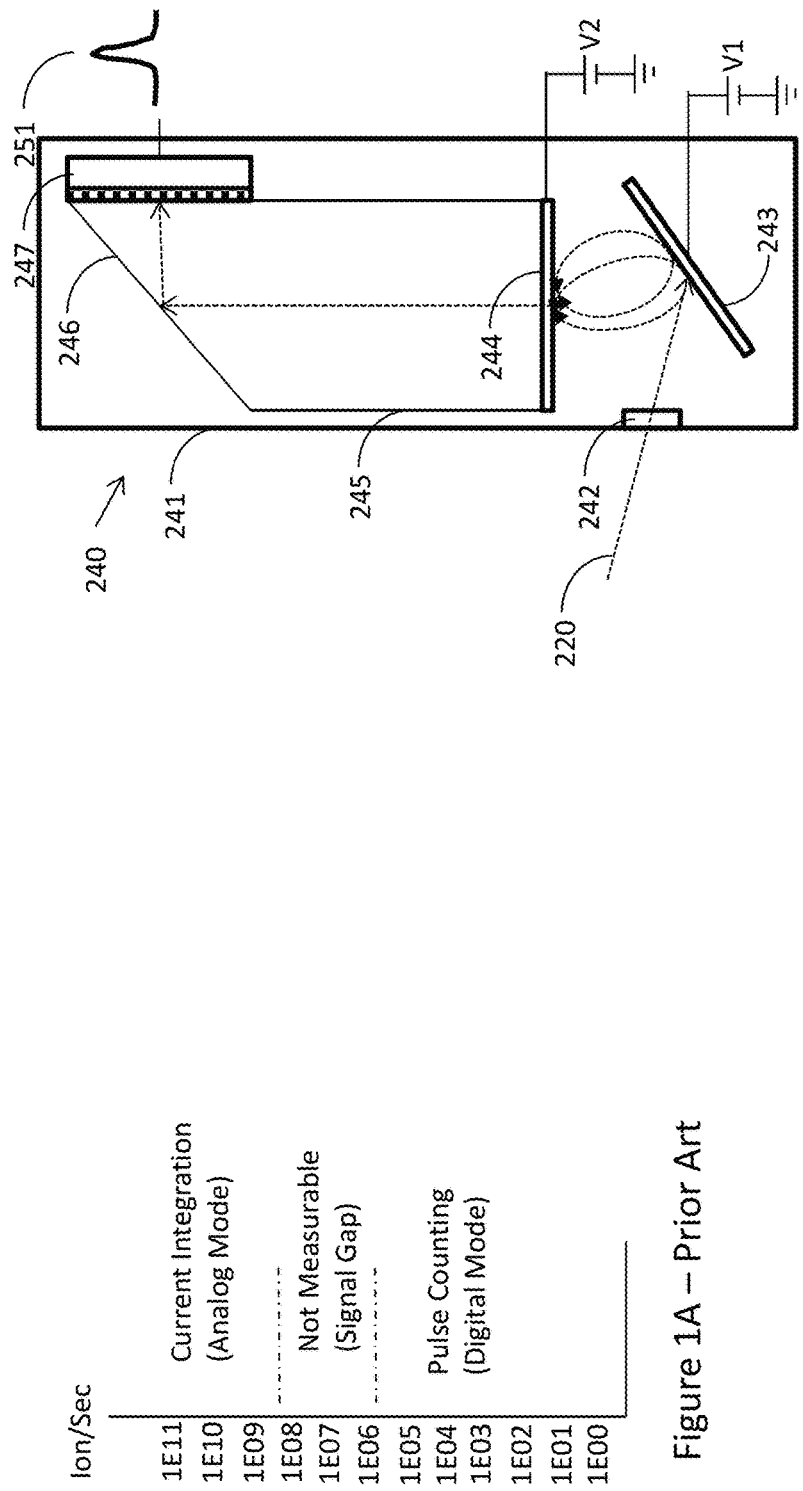
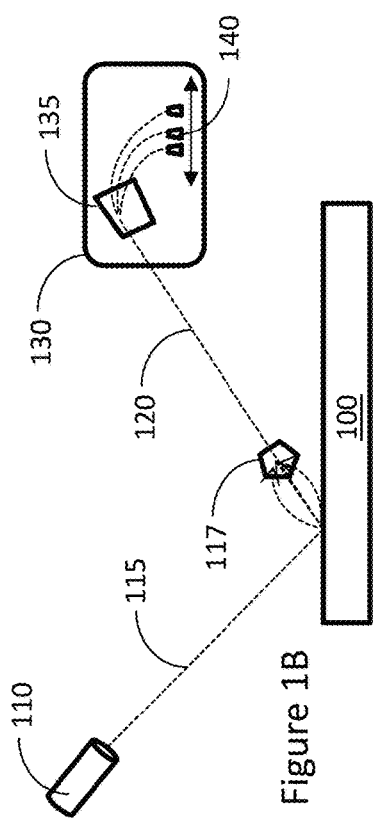
Figure 1A – Prior Art
Figure 1B
Figure 2

MASS SPECTROMETER DETECTOR AND SYSTEM AND METHOD USING THE SAME

RELATED APPLICATION

The present application is the national phase of International Application No. PCT/US2017/032447, filed on May 12, 2017, and the disclosure of which is hereby incorporated herein by reference in its entirety.

BACKGROUND

1. Field

This disclosure relates to the field of secondary ion mass spectrometers and, more specifically, for an improved mass spectrometer detector and a system and method using the detector for extending the dynamic range of particle detection in such an apparatus and improving detection accuracy.

2. Related Art

Secondary ion mass spectrometry (SIMS) is a technique used to analyze the composition of a sample by sputtering the surface of the sample with a focused primary ion beam and collecting and analyzing secondary ions ejected from the sample. The mass to charge ratios of these secondary ions are indirectly measured by separating them spatially with a mass analyzer, so as to determine the elemental, isotopic, or molecular composition of the sample. The secondary ions are detected generally using one of two methods: a Faraday cup or an electron multiplier. A Faraday cup measures the ion current hitting a metal cup, and is sometimes used for high current secondary ion signals. In an electron multiplier an impact of a single ion starts off an electron cascade, resulting in a pulse of electrons which is recorded directly. The electron multiplier can comprise a series of individual dynodes, a channel electron multiplier, or a microchannel plate.

Generally, mass spectrometers operate in two regimes: a counting mode and an analog mode. As illustrated in FIG. 1A, digital mode is effective up to about $1 \times 10^6$ ions/second, depending on the characteristics of the detector. Analog mode is effective above about $1 \times 10^8$ ions/second. As shown in FIG. 1A, a first problem is that a detection gap exists between about $1 \times 10^6$ ions/second to about $1 \times 10^8$ ions/second, since the current is too high for the digital mode to separate the individual events, but is insufficient to provide a reading for estimating the arriving ions. Another problem, that is not manifested in FIG. 1A, is that the correlation between the digital mode and analog mode is not accurate and/or repetitive. Thus, when switching between digital and analog modes, one gets an artificial "jump" in the reading. These problems can be more fully understood from the following.

In pulse counting mode, each individual particle is assumed to produce an "event" in the detector output signal, which can be identified and counted. Pulse counting mode has the advantage of being inherently quantified since each incoming particle is assumed to produce a single detected event. (It is important to note that, in this case, we are not attempting to characterize each event for quantitative properties such as pulse height, total charge, etc.) The two limitations of pulse counting mode are that to be properly identified (1) each incoming particle (or at least a sufficient percentage of them) needs to produce an event over the detection threshold and that (2) any two particles need to arrive with a separation such that, given the pulse shape and length, they can be independently detected. Therefore, the pulse counting mode is restricted to the detection of relatively low rates of ion arrival. The ion arrival rate is assumed to be described by a Poisson process and the generation of electrons on the conversion dynode and photons in the scintillator are also described by statistical processes.

Although the average ion arrival rate may be such that ions pulses are sufficiently separated in time as to be independently detectable, the distribution of ion arrival times dictates that some percentage will occur too close together in time for this to be the case. For this reason, the maximum ion arrival rate at which counting can be used must include a specification for what percentage of events can be missed due to pulse stack-up. This percentage should be such that valid statistical estimation of the true count can be made despite the non-detection of some events.

Regarding analog mode, SIMS instruments generally use a Faraday cup approach in which the current is proportional to the arrival rate of ions. However, at rates below about $1 \times 10^8$ ions/second, the current is too low to measure. Using the electron multiplier in an analog mode is not accurate. This is due to the statistics of secondary electron emission in the dynodes, channel walls, and/or photon emission in the scintillator. In addition to these short term variations, there will also be long term variations due to changes in the surface condition of the conversion dynode, aging of the scintillator, PMT photocathode and dynodes, etc. For these and other reasons, when operating in analog mode it is not possible to use the integrated area under all the pulses in an acquisition to measure incoming ion flux unless the percent average pulse area per incoming ion is accurately known. For this reason, accurate measurement of ion arrival rates above a certain value, determined by the properties of the dynode, scintillator, and detector, is not possible using an electron multiplier.

What is needed, therefore, is an improved detector having faster detection speed to enable separation of incoming ions. Also needed is a method to calibrate the average pulse area per incoming ion, thus enabling an accurate analog-mode measurement for ion arrival rate.

SUMMARY

The following summary of the invention is included in order to provide a basic understanding of some aspects and features of the invention. This summary is not an extensive overview of the invention and as such it is not intended to particularly identify key or critical elements of the invention or to delineate the scope of the invention. Its sole purpose is to present some concepts of the invention in a simplified form as a prelude to the more detailed description that is presented below.

Aspects of the invention provide an improved ion detector for use in mass spectrometry. The improved detector has a fast rise and decay time, thus enabling better separation of detection events in digital mode. The detector also provides improved signal to noise ratio, thus enhancing detection performance.

According to aspects of the invention, an ion detector for SIMS is provided, comprising: an electron emission plate coupled to a first electrical potential and configured to emit electrons upon incidence on ions; a scintillator coupled to a second electrical potential, different from the first electrical potential, the scintillator having a front side facing the electron emission plate and a backside, the scintillator configured to emit photons from the backside upon incidence of electrons on the front side; a lightguide coupled to the backside of the scintillator and confining flow of photons emitted from the backside of the scintillator; and a solid-state photomultiplier coupled to the light guide and having an output configured to output electrical signal corresponding to incidence of photons from the lightguide. The solid-state photomultiplier may be a silicon photomultiplier or an array of avalanche photodiodes having outputs coupled together to provide a single electrical signal. The lightguide may have a reflective surface which directs the photons onto the solid-state photomultiplier. The solid-state photomultiplier may be coupled to a rear surface of the lightguide.

In various embodiments, several detectors are provided in spatial separation, such that several species can be detected simultaneously. In disclosed embodiments, the detectors are movable, such that by spatial positioning of a detector, the same detector can be used for detecting different species. Therefore, when the material composition is known beforehand, e.g., various material layers on a semiconductor wafer, the detectors can be arranged spatially to detect the species expected from that sample. Then the counting from each detector can be used to verify that the sample indeed has the expected species at the expected concentration and depth, e.g., at the expected doping levels. Similarly, the counting from the different detectors can be used to study the composition of the interface between two layers of different materials.

Thus, according to disclosed aspects, a secondary ion mass spectrometer system is provided, comprising: an ion source providing a primary ion beam; a secondary ion extractor collecting secondary ions sputtered from a sample by the primary ion beam; beam forming optics receiving the secondary ions from the secondary ion extractor and forming a secondary ion beam; a mass analyzer forming a trajectory onto a focal plane; a plurality of ion detectors movably positioned along the focal plane; wherein each of the ion detectors comprises: a first section configured to emit electron upon impingement of secondary ions; a second section configured to emit photon upon impingement of electrons; a third section configured to emit an electrical signal upon impingement of photons; and, a lightguide coupled on one end to the second section and on another end to the third section.

In various embodiments the secondary ion mass spectrometer may further comprise a spectrometer configured to allow only secondary ions within a desired band of mass-to-charge ratio to pass through. The mass analyzer may comprise a spectrometer; a plurality of quadruples; at least one hexapole; and, a main magnet. The first section may comprise an electron emission plate coupled to a first electrical potential and configured to emit electrons upon incidence on ions. The second section may comprise a scintillator coupled to a second electrical potential, different from the first electrical potential, the scintillator having a front side facing the electron emission plate and a backside, the scintillator configured to emit photons from the backside upon incidence of electrons on the front side. The third section may comprise a solid-state photomultiplier coupled to the light guide and having an output configured to output electrical signal corresponding to incidence of photons from the lightguide.

Disclosed aspects also provide a system wherein counting mode and analog mode can be operating simultaneously. According to disclosed embodiment, two signals are obtained from the detector, both of which correlate to the same detection event. The two signals are applied to two channels; one channel includes electronic devices optimized for the counting mode detection, while the other channel includes electronic devices optimized for analog mode detection. Both channels can be operated simultaneously since the two signals, while correlated to the same detection events, are generated separately.

Disclosed embodiments provide a method for simultaneously operating counting mode and analog mode at a photomultiplier of a SIMS apparatus. The method comprises coupling a first signal line to the photomultiplier; configuring a digital event counter to receive an input from the first signal line and provide a discrete event count output corresponding to the input; coupling a second signal line to the photomultiplier independently of the first signal line; configuring an analog integrator to receive input from the second signal line and provide integrated analog output simultaneously with the discrete event count output from the digital event counter. Coupling the first signal line to the photomultiplier may include coupling the first signal line to a bias input line of the photomultiplier, while coupling the second signal line may include coupling the second signal line to an output line of the photomultiplier. Coupling the first signal line to the photomultiplier may include coupling the first signal line to a dynode of the photomultiplier, while coupling the second signal line may include coupling the second signal line to a collector of the photomultiplier.

According to further aspects, a calibration method is provided utilizing simultaneous signals of the analog and digital modes. Specifically, an ion arrival rate is produced by some means to be within a desired regime. Then pulse counting mode is used to produce a number of pulses while simultaneously the analog signal is integrated to produce a total area over all pulses. The signals from both channels are used to for calibration. For example, in one embodiment the signals are used to generate a scaling factor to be applied when switching between counting and analog modes. In another example, the integrated pulse area is divided by the number of pulses to thereby render the average area per pulse, which is used as a calibration factor.

BRIEF DESCRIPTION OF THE DRAWINGS

The accompanying drawings, which are incorporated in and constitute a part of this specification, exemplify the embodiments of the present invention and, together with the description, serve to explain and illustrate principles of the invention. The drawings are intended to illustrate major features of the exemplary embodiments in a diagrammatic manner. The drawings are not intended to depict every feature of actual embodiments nor relative dimensions of the depicted elements, and are not drawn to scale.

FIG. 1A is a schematic illustration digital and analog detection regimes according to the prior art.

FIG. 1B is a schematic illustration of a system according to an embodiment of the invention.

FIG. 2 is a schematic illustration of an ion detector according to an embodiment of the invention, while

DETAILED DESCRIPTION

Figure 2A:
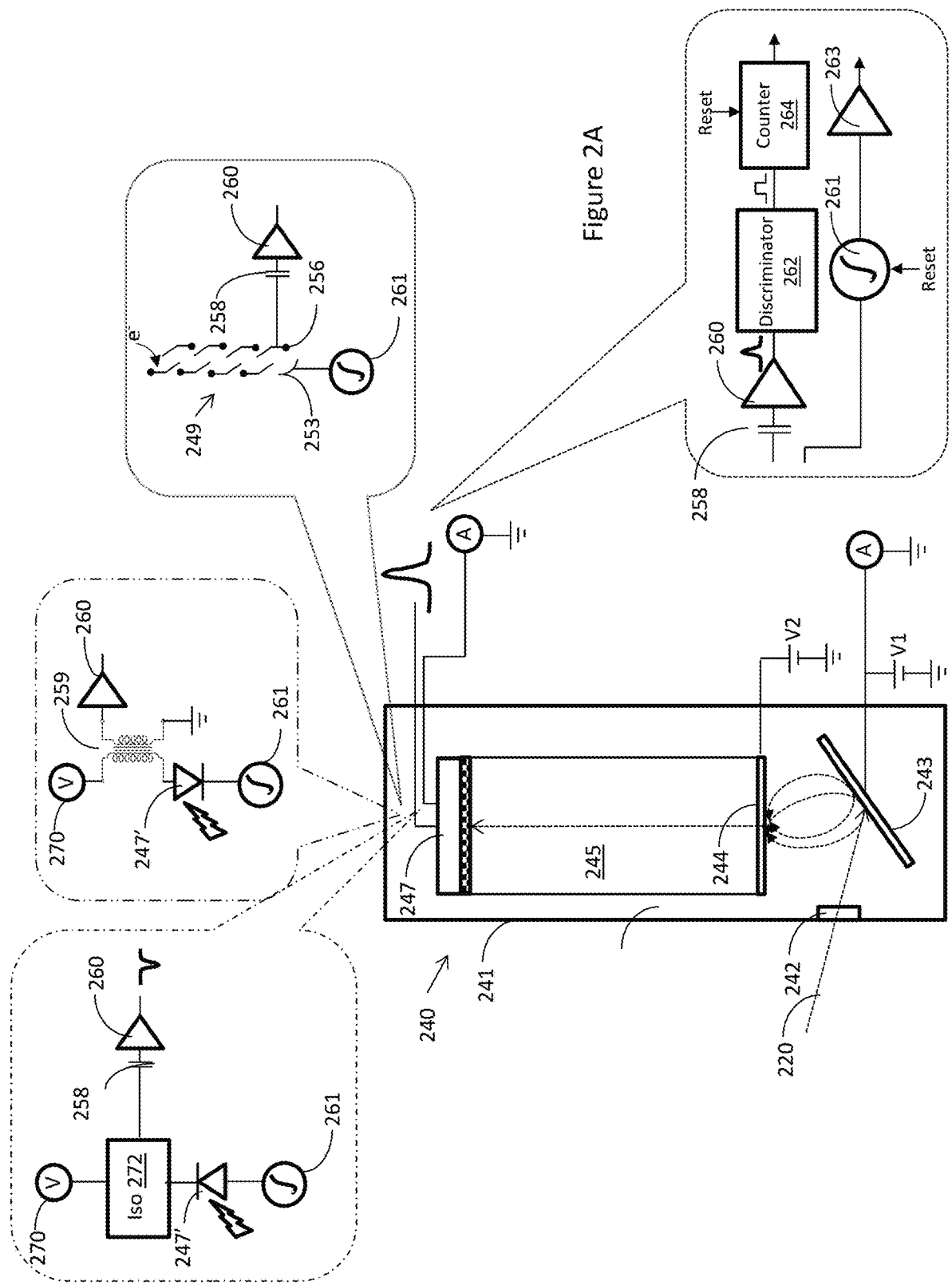
FIG. 2A is a schematic illustration of an ion detector according to another embodiment of the invention and illustrated other features that may implemented in any embodiment disclosed herein.

Various embodiments will now be described with reference to the drawings. Each embodiment may be described with reference to one or more features or elements, but it should be appreciated that each described feature and/or element may be used in conjunction with other features and/or elements of other embodiments. That is, the features and elements may be interchangeable and/or additive among the various embodiments.

FIG. 1B schematically illustrates the construction of one embodiment. A sample 100 is to be examined to determine the material composition of the sample. An ion source 110 is used to generate a focused ion beam 115, which is made to impinge on sample 100, so as to eject secondary ions from the sample. The extraction and beam shaping optical elements 117 collect charged secondary ions and forms secondary ion beam 120 that is delivered into detection section 130. Detection section 130 includes a mass analyzer 135, which changes the trajectory of the secondary ions 120. Since different ions have different mass-to-charge ratio, the effect of the mass analyzer on their trajectory is different, such that different ions assume different spatial trajectory path (three of which are shown). A plurality of detectors 140 are positioned at different spatial locations inside the detection section 130, such that each detector is positioned to intercept ions of certain mass-to-charge ratio. Each detector 140 is provided with mechanized positioning means, such that the spatial position of each detector 140 can be changed, so as to detect ions of different mass.

FIG. 2 schematically illustrates an embodiment of a detector 240 according to one embodiment. The detector 240 of FIG. 2 is a scintillator coupled with a solid-state photomultiplier, providing enhanced dynamic range and fast signal response time, in that it has fast decay time to enable separation of rapidly arriving ions. As such, the detector converts ions stream into an electron stream, then converts the electron stream into a photon stream, and finally converts the photon stream into an electrical signal.

Secondary ions enter the enclosure 241 via window 242 and hit electron emission plate 243. Electron emission plate is biased by potential V1, to thereby eject electrons upon being hit by ions. The electrons are emitted in various directions, but by applying a potential V2 to scintillator plate 244, the electrons are focused onto the scintillator plate 244. When the electrons hit the front side of the scintillator plate 244, the scintillator plate 244 emits photons from the back surface. A tubular light guide 245 is optically coupled to the scintillator plate 244 and may have various cross-section shape as needed, e.g., rectangular or square cross-section. The light guide 245 may be made of light conducting transparent material. The photons travel within light guide 245 and remain confined inside the light guide by total internal reflection. In the embodiment of FIG. 2, light guide 245 has a reflective surface 246 (forming a prism), which directs the photons (e.g., by total internal reflection) into solid-state photomultiplier 247. The solid-state photomultiplier 247 generates electrical signal corresponding to the photons hitting the solid-state photomultiplier. In this embodiment, the solid-state photomultiplier may be a silicon photomultiplier (also referred to as SiPM) and may comprise an array of avalanche photodiodes (APD). The signal from the photodiodes can be summed up to provide a single output signal having sharp pulses 251 upon detection of arriving photons, as schematically shown in FIG. 2. The output of the solid-state photomultiplier 247 can be used to count the pulses, corresponding to arriving ions of a specific species, depending on the spatial position of detector 240.

FIG. 2A schematically illustrates an embodiment of a detector 240 according to another embodiment. The elements of the embodiment of FIG. 2A are similar to that of FIG. 2, except that the light guide 245 does not have a reflecting surface forming a prism. Rather, the solid-state photomultiplier 247 is attached directly to the back of the light guide 245. Other than that, the detectors of FIG. 2 and FIG. 2A are the same.

FIG. 2A also illustrates various features relating to the collection of detection signals. Any one of these features can be implemented in the same way in the embodiment of FIG. 2, or any other embodiment disclosed herein.

A first feature illustrated in FIG. 2A is the simultaneous operation of counting and analog modes. This will be first explained by reference to the elements shown inside the dashed callout. In the prior art, the system is operated either in counting mode (when the ions arrival rate is sufficiently low to enable discrimination of individual arrival events) or in analog mode (when the arrival rate is too high to enable separation). Another reason that both modes cannot operate simultaneously in the prior art is that the signal is too weak, so it cannot be split into two channels. In essence, since the output signal is made of electron current, splitting that signal into two channels would mean that each channel would have fewer electrons (i.e., lower current) than what was originally output by the detector. Consequently, when the arrival rate is low, the detection signal has insufficient electrons to be able to share among the two channels.

However, embodiments disclosed herein enable a system wherein both modes can operate simultaneously. Referring back to FIG. 2A, the dashed callout illustrates one embodiment wherein two signals are obtained from the detector and are fed into two channels. The top channel is the counting mode channel, while the lower channel is the analog channel. The two output signals are correlated to the same detection events, such that both channels simultaneously detect the same amplified ion flux. In the top channel, the signal is conditioned by capacitor 258, amplified by amplifier 260, and then the amplified signal is input to discriminator 262, which outputs a digital signal corresponding to the input from amplifier 260. The digital signal is input to counter 264 to count the detection events. A reset signal enables resetting of the counting. In the bottom/analog channel, the signal from the detector is integrated by integrator 261 and is then amplified by amplifier 263. The integrator may be reset by a reset signal. These two channels can be operated simultaneously or one at a time.

As noted above, the output signal of the detector is generally insufficient to operate both counting mode and analog mode simultaneously. The following description details various embodiments that overcome this problem. It is noted that the solutions detailed herein can be implemented in conjunction with the inventive detector disclosed herein, or with conventional detectors.

A first example is illustrated in the dash-dot callout of FIG. 2A. In the dash-dot callout APD 247' schematically represents the solid-state photomultiplier 247. The APD 247' is biased by voltage potential 270, through an isolator 272. A first output is connected to the bias line leading from the voltage potential 270 to the APD 247'. This first output line is led to the counting mode channel. On the other hand, a second output signal is obtained from the output of the APD 247'. The second output line is led to the analog mode channel. When a detection event occurs, current will be flowing out of the output of the APD 247' which will be directed to the analog channel for sensing. Simultaneously, there will be a voltage drop on the bias line, which will be detected by the counting mode channel. By this configuration, the two channels sense the same event simultaneously, even though the two channels need not share the same output signal.

Figure 2B:
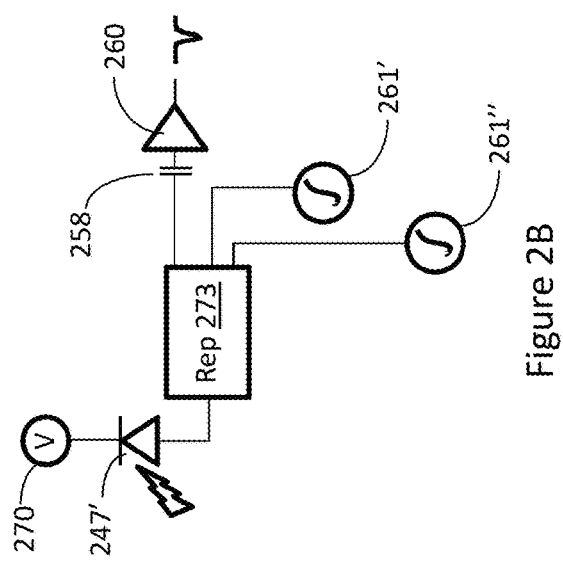
FIG. 2B is a schematic illustration of circuits using isolator, according to disclosed embodiments.

Another arrangement that is similar to that of FIG. 2A is illustrated in FIG. 2B. APD 247' schematically represents the solid-state photomultiplier 247. The APD 247' is biased by voltage potential 270 and is connected to replicator 273. The signal from replicator 273 is output to the channel with capacitor 258 and amplifier 260, as in the embodiment of the dash-dot callout of FIG. 2A. Another line is connected to have the signal integrated by high gain integrator 261', while a third line is connected to have the signal integrated by low gain integrator 261'.

An alternative configuration is illustrated in the two dot-dash callout. The arrangement is similar to that of the dot-dash callout, except that the line of the counting channel is not directly connected to the bias line from the voltage potential 270, but is rather coupled to it via transformer 259. Other than that the two arrangements are the same.

Figure 2C:
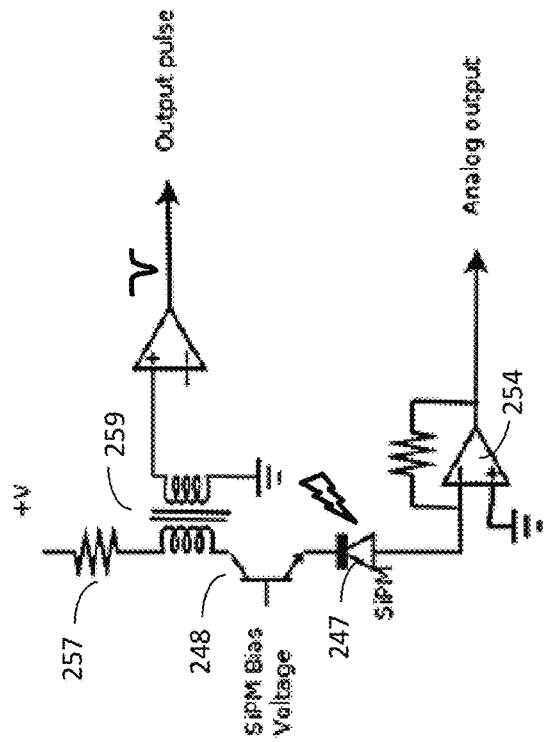
FIGS. 2C and 2D are schematic illustration of circuits using isolator, according to disclosed embodiments.
Figure 2D:
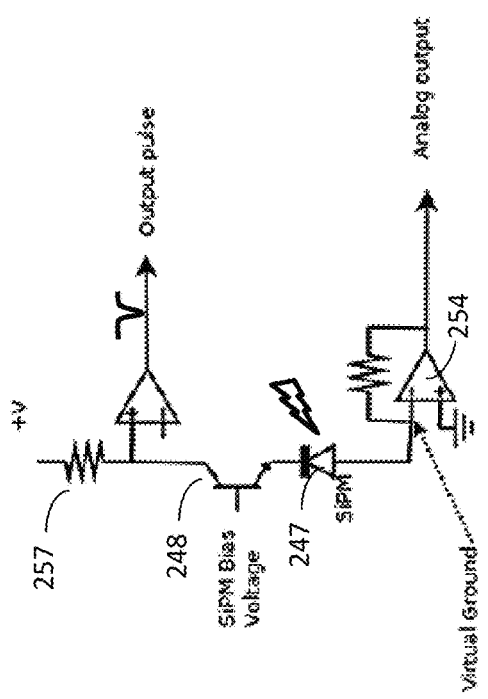

Examples of circuits using isolator are illustrated in FIGS. 2C-2D. In these embodiments the pulse and analog signal paths originate on opposite ends of the solid-state photomultiplier 247, specifically, the pulse signal path is couple to the cathode side of the photodiode, while the analog signal path is coupled to the anode side of the photodiode. In both circuits, the operating voltage of the solid-state photomultiplier 247 is regulated by a transistor 248 with respect to the virtual ground of an op amp 254 (shown connected in the inverting configuration, so that the inverting input of the op-amp is coupled to the anode of the photodiode). For the circuit illustrated in FIG. 2C, the op amp 254 provides the analog signal and the voltage drop in the top resistor 257 (caused by photo-current) becomes the pulsed signal. In the circuit of FIG. 2D, instead of a voltage drop in a resistor, the current pulse is sent through a pulse transformer 259.

In other words, the embodiment of FIG. 2C provides an isolator circuit for ion detector having a photodiode, comprising: a bias transistor having its emitted coupled to a cathode of the photodiode and a collector coupled to a resistor; a pulse signal path coupled between the collector and the resistor; an analog path coupled to an anode of the photodiode, wherein the analog path comprises an operational amplifier (op-amp) having one input coupled to the anode of the photodiode, a second input coupled to ground, and an output providing an analog signal response corresponding to the photodiode sensing photons. In the embodiment of FIG. 2C the op-amp is coupled to the anode of the photodiode in an inverting configuration, wherein the inverting input of the op-amp is coupled to the anode of the photodiode. Also, a feedback resistor is coupled between the inverting input and the output of the op-amp.

The embodiment of FIG. 2D provides an isolator circuit for ion detector having a photodiode, comprising: a bias transistor having its emitted coupled to a cathode of the photodiode and a collector coupled to a resistor; a pulse signal path coupled between the collector and the transistor; an analog path coupled to an anode of the photodiode, wherein the analog path comprises an operational amplifier (op-amp) having one input coupled to the anode of the photodiode, a second input coupled to ground, and an output providing an analog signal response corresponding to the photodiode sensing photons. In the embodiment of FIG. 2D the pulse signal path comprises a transformer having an input side coupled between the resistor and the cathode of the photodiode, and an output side providing a digital pulse response corresponding to photodiode sensing photons. In the analog signal path, the op-amp is coupled to the anode of the photodiode in an inverting configuration, wherein the inverting input of the op-amp is coupled to the anode of the photodiode. Also, a feedback resistor is coupled between the inverting input and the output of the op-amp.

Figure 2E:
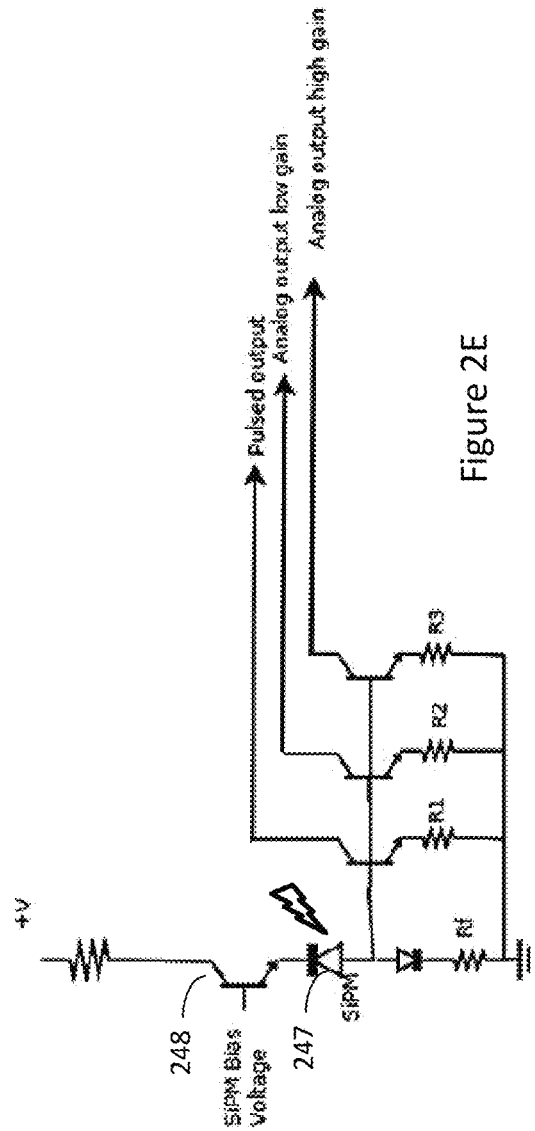
FIG. 2E is a schematic of a circuit using replicator, according to disclosed embodiment.

FIG. 2E illustrates an example of a replicator circuit for providing multiple output signals, according to one embodiment. In this embodiment, all of the output signals are coupled to the anode side of the photodiode. In the embodiment of FIG. 2E the cascaded transistors drive current through R1, R2, and R3; the current is Rf/Rx*(SiPM current), because the transistors will all maintain the same base to emitter voltage drop. In this example, resistor R1 would be set relatively low in value, so as to provide a large gain for the pulsed output. So, the embodiment of FIG. 2E provides a replicator circuit for ion detector having a photodiode, comprising: a bias transistor having its emitted coupled to a cathode of the photodiode and a collector coupled to a resistor; an anode of the photodiode is coupled to ground via a reference resistor, optionally through a diode having its cathode connected to the reference resistor and its anode connected to the anode of the photodiode; a base of a first second and third transistors is connected in common to a tap positioned between the resistor and the anode of the photodiode; a second tap, positioned between the resistor and ground is connected in common to a first, second and third resistors; the first resistor coupled to an emitted of the first transistor, a second resistor coupled to an emitted of the second transistor, and the third resistor coupled to an emitted of the third transistor; wherein a pulsed signal path is coupled to a collector of the first transistor; a first analog signal path is coupled to a collector of the second transistor, and a second analog signal path is coupled to a collector of the third transistor.

As indicated, this feature is not limited to the use of the disclosed detector, but can also be implemented in systems using other detectors, such as a photomultiplier, a channel electron multiplier, etc. An example is illustrated in the solid-line callout. In the illustrated embodiment an electron multiplier 249 is used as a detector (the electron multiplier 249 may be part of a photomultiplier or other conventional sensor). An electron e-hits the first dynode, generating a cascade of electrons from one dynode to the next, until they hit the collector 253. The output of the collector 253 is coupled to the analog channel. Conversely, the last dynode 256 is tapped and is coupled to the counting channel. Consequently, again the two output signals are correlated to the same detection event, but are generated from different elements of the system such that the two channels need not share the same signal.

In the embodiment of FIG. 2A, an optional second analog output line is provided, which can be used both for calibration and measurements. The line leading the DC potential V1 to the electron emission plate 243 is tapped and led to a current meter, e.g., an ammeter, or to an analog channel, such as the one shown i9*n* the dashed callout. This measurement provides direct analog measurement corresponding to the arriving ions. There should be a correlation between the current measurements from the line leading to the electron emission plate and the output line of the detector, such that the output of both can be used to study the conversion efficiency of the detector and thereby calibrate the digital count output of the detector.

Figure 3:
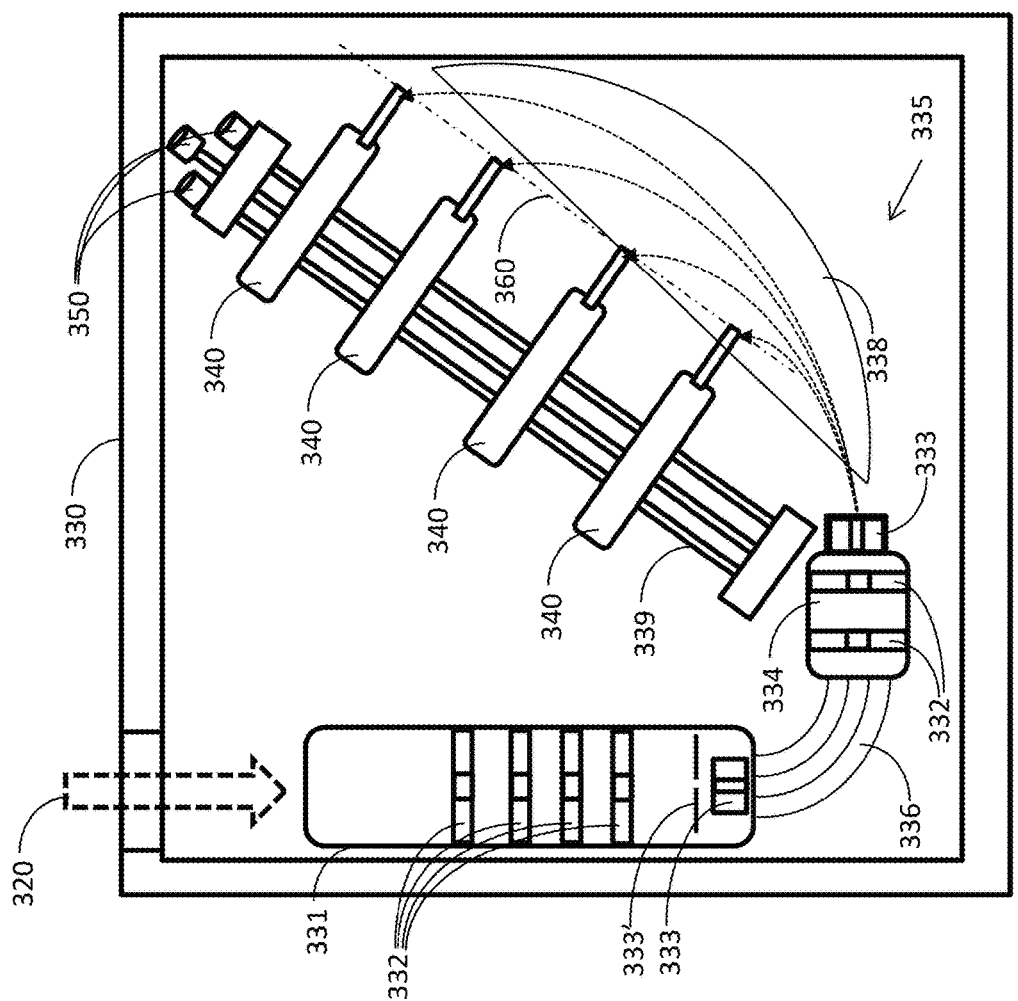
FIG. 3 is a schematic illustration of an ion detecting scheme according to one embodiment of the invention.

FIG. 3 is a schematic illustration of an ion detecting scheme according to one embodiment of the invention. Detection section 330 shown in FIG. 3 includes only the elements related directly to the detection and omits element relating to extraction, charge compensation and filtering, which should be inserted upstream of and operated in conjunction with detection section 330. Once the ion beam 320 passes the extraction, charge compensation and filtering elements, it enters the detection section 330 and passes through a beam shaping tube 331. The beam shaping tube 331 may comprise a plurality of lenses 332, which may be magnetic lenses or electrostatic lenses, e.g., quadrupole lenses. In this specific embodiment, quadrupole lenses are used to shape and focus the beam. A hexapole 333 is provided at the exit of the beam shaping tube 331 to provide higher order optical correction to the beam. Optionally, a slit 333' may be provided upstream of the hexapole 333 so as to filter out ions at the fringes of the beam. Alternatively, or additionally, another slit can be provided downstream of the hexapole 333.

The shaped ion beam then exits the beam shaping tube 331 and enters the mass analyzer 335, which separates the ions according to their mass-to-charge ratio. The mass analyzer 335 includes a spectrometer 336, which is followed by quadruples 332, a hexapole 333, and main magnet 338. Generally, the extraction and beam shaping elements act on all charged particles available to be extracted, but not all are of interest for a particular analysis. Therefore, the spectrometer 336 is energized to a selected voltage potential that enables a selection of a desired mass-to-charge ratio band to pass through to the quadruples 332. The quadruples 332 and hexapole 333, together with the main magnet 338, focus the beam onto a focal plane 360 (dash-dot line in FIG. 3). The detectors 340 are arranged spatially on the mass analyzer focal plane 360. As ions exit the hexapole 333 their trajectory is changed according to each individual ion's mass to charge ratio, such that each ion arrives at a different point on the focal plane 360. The detectors 340 are movably mounted on tracks 339, which parallels the focal plane 360. Mechanized control 350 may be included to control the positioning of each detector 340 individually. Thus, the multiple detectors 340 can be positioned spatially along focal plane 360 to detect expected ions according to each ion mass to charge ratio, within the band selected by the spectrometer 336. Each of detectors 340 may be implemented according to any of the embodiments disclosed herein.

Figure 4:
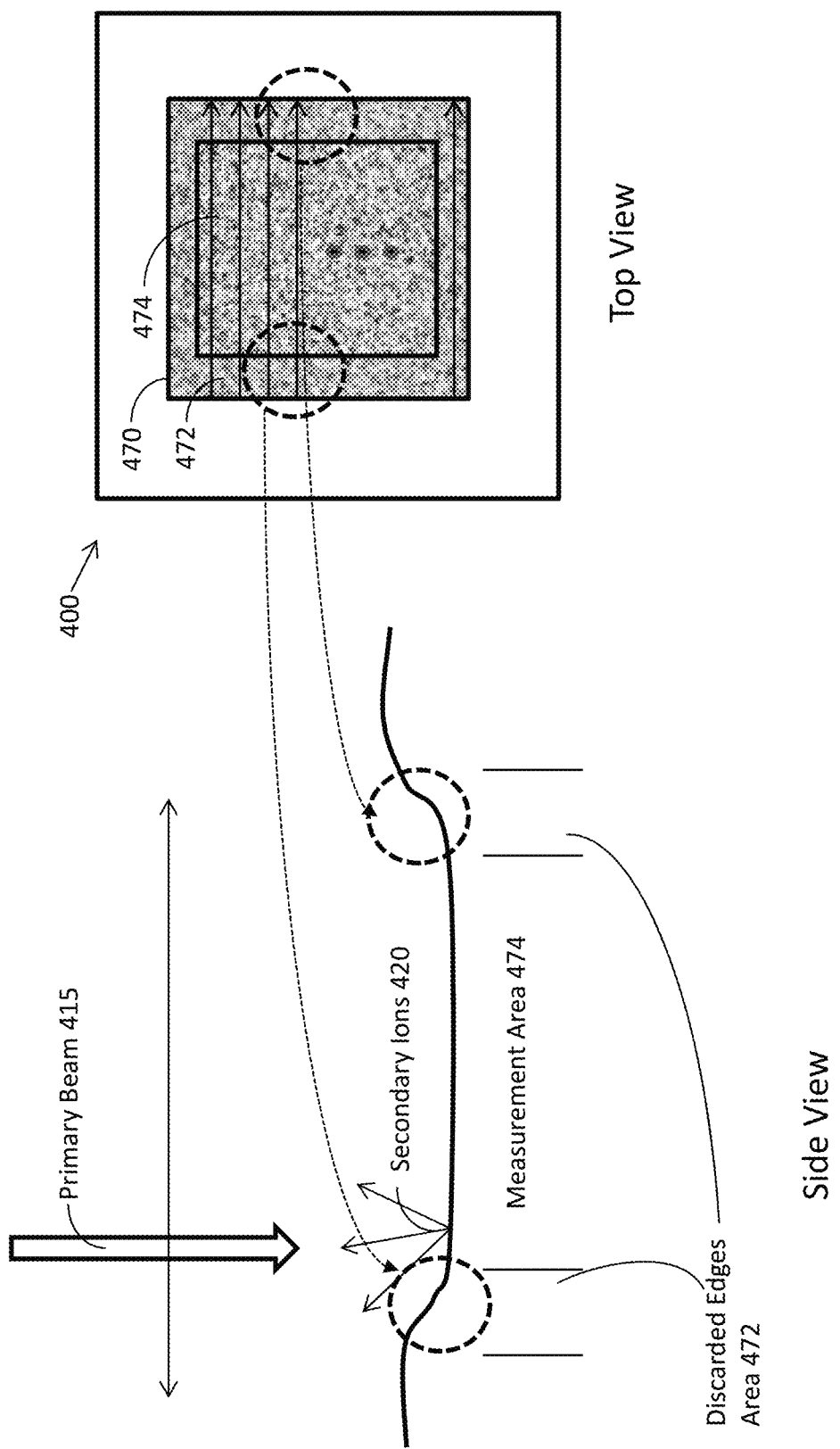
FIG. 4 illustrates a condition wherein the ion sputtering causes a crater with different sputtering rate at the edges and at the center of the crater.

In a raster-scan secondary ion mass spectrometer, the primary ion beam is used to sputter material from the sample of interest. As the material is sputtered, secondary ions are detected to thereby determine the material composition of the sample. As the primary ion beam scans the sample, it creates a crater in the sample, due to the sputtering of material of the sample. However, since the sputtering at the edge of each raster scan is not uniform, the data relating to the edge of the raster scan is discarded. FIG. 4 illustrates this condition, wherein the side view shows one line scan, of the many scan lines required to test the entire sample. The scanning of the primary beam over the sample creates a crater due to the sputtering of material from the sample. The relatively flat bottom of the crater is the area where data is collected to determine the material make-up of the sample. However, at the edges of the crater, generally defined by the area where a slope is present, the sampling is inaccurate, so that the data is discarded.

FIG. 4 illustrates a condition wherein the ion sputtering causes a crater with different sputtering rate at the edges and at the center of the crater. In FIG. 4 a sample 400 is analyzed by scanning primary ion beam 415 over area of interest 470. As the beam is raster scanned, illustrated by the arrows in the top view, a crater is created since the material makeup of the sample 400 is sputtered away. At the edges 472 of the crater the sputtering rate and trajectory of secondary ions is different than from the flat bottom area 474 of the crater. Therefore, in the prior art data from the edges 472 has been discarded.

In one embodiment, one of the channels is used to perform measurements while the primary beam is scanning over the bottom area 474 of the crater. For example, if the ion count is too high to use pulse counting mode, then the analog mode is used for measurement during the time the primary beam scans the bottom area 474 of the crater. On the other hand, during the time that the primary beam scans at the edge 472 of the crater, the data is not used for mass spectroscopy measurement. Instead, the simultaneous data from the pulse counting and analog mode channels are used to calibrate the analog channel with respect the pulse counting channel.

In another embodiment, one channel is used to perform the mass spectroscopy measurement during the time that the primary beam scans the bottom of the crater. At the same time, the data obtained from the other channel is used to improve the data of that channel. Additionally, when the primary beam scans over the edge of the crater, the pulse-counting channel is used to calibrate the analog channel. For example, a scaling factor can be calculated from the difference between the output of the two channels.

In one embodiment, this calibration is performed at periods of time when the detected signal is safely within the pulse counting regime (e.g., lower than about $10^7$ ions/sec) and for a sufficient period of time during an acquisition that a sufficient number of ion events are integrated in the analog channel and counted in the pulse counting channel to determine the average current per ion to within specification and over a period of time over which the statistical processes involved in detection are essentially stationary. According to this method, a scanning period is set and the beam is made to scan over a uniform area of a sample. The analog channel and the counting mode channel are activated to operate simultaneously. At the end of the scanning period the scanning of the beam is stopped and the outputs from the analog channel and the counting mode channel are used to generate a calibration factor. This operation may be repeated a number of times, using the same or different ion flow rates.

The method is useful when ion fluxes need to be measured (or may need to be measured) which are too high for pulse counting be used. The challenge is to guarantee sufficient dual sampling on each detector on which analog mode is needed in the regime where pulse counting is possible. According to some embodiments a suitable ion arrival rate is produced at each detector for which analog mode is needed, during the raster scan and without interfering with acquisition.

According to one embodiment, electronic gating regions of the scan frame offer a feasible means for implementing this approach. Measurement of the ion flux on each detector during the first N scans could be used to determine a single attenuation factor which would cause the arrival rate at each of the detectors for which this calibration is needed to be within the safe pulse counting region. This attenuation factor would be achieved by some means in the secondary ion optics, such as deflecting or defocusing a beam on an aperture during the electronically gated portions of a frame, and data collected on both the analog and pulse-counting channels. This data, with some moving average, would be used to track and calibrate the average current per pulse, which would then be used to convert the analog signal during the measurement segments of a frame into calibrated ion arrival rate.

It should be noted that the attenuation factor does not need to be known accurately enough to achieve a well-known ion arrival rate. It is only needed that it is known well enough that an ion arrival rate can be achieved that is within a regime where pulse counting and analog output are both possible. In any case, the goal is not to create a known ion arrival rate, but a measurable ion arrival rate which can be used along with the analog signal to calibrate the analog output. The gating periods may coincide with the times wherein the primary beam scans over the edges of the crater.

In the above description, reference is made to the analog channel in the callout of FIG. 2A. However, alternatively, the tap into the electron emission plate 243 can be used as the analog channel. Moreover, when using the analog channel of the callout in FIG. 2A, the tap of the electron emission plate 243 can be used to further calibrate the analog channel.

According to an embodiment, a system for performing secondary ion mass spectroscopy is provided, comprising: a primary ion beam; optics arrangement scanning the primary ion beam over a sample; a detector detecting secondary ions emanating from the sample and generating a detection signal; a first detection signal line and a second detection signal line coupled to a first and second channels; wherein the first channel comprises elements configured to provide ion counting output and the second channel comprises elements configured to provide integrated current signal. The system may further comprise a controller programmed to receive the signals from the first and second channels and generate a measurement data when the primary beam is at a central portion of its scan and calibrate the first and second channels with respect to each other when the beam is at an edge of its scan.

According to further embodiment, a method for operating a secondary ion mass spectrometer having a counting mode and an analog mode is provided, comprising: scanning a primary ion beam over a sample so as to sputter secondary ions from the sample; collecting the secondary ions from the sample and simultaneously generating a first detection signal and a second detection signal; applying the first detection signal to an ion counting channel; applying the second detection signal to an ion analog channel; and generating a calibration factor from the output of the analog channel and the pulse counting channel. The first detection signal may be generated from a bias line coupled to the detector, while the second detection signal may be generated from the output of the detector. When an electron-multiplier is used as the detector, the first detection signal may be generate from a line tapped to a dynode, while the second detection signal may be generated from the output of the collector.

Further, a method for performing secondary ion mass spectrometry is provided, comprising: sputtering secondary ions from a sample; collecting the secondary ions and forming a secondary ion beam; passing the secondary ion beam through a mass analyzer so as to form multiple secondary ion trajectories lined up on a focal plane; placing a plurality of detectors on the focal plane at expected secondary ion trajectories according to mass-to-charge ratio; at each of the detectors performing: generating a flow of electrons corresponding to received secondary ions; generating a flow of photons corresponding to the flow of electrons; and generating a flow of electrical current corresponding to the flow of photons. The method may further comprise transporting the flow of photons inside a lightguide. Generating the flow of electrical current corresponding to the flow of photons may comprise directing the flow of photons onto a solid-state photomultiplier. The method may further comprise tapping the flow of electrical current and integrating over the tapping. The method may further comprise tapping the flow of electrons and measuring a current over the tapping.

It should be understood that processes and techniques described herein are not inherently related to any particular apparatus and may be implemented by any suitable combination of components. Further, various types of general purpose devices may be used in accordance with the teachings described herein. The present invention has been described in relation to particular examples, which are intended in all respects to be illustrative rather than restrictive. Those skilled in the art will appreciate that many different combinations will be suitable for practicing the present invention.

Moreover, other implementations of the invention will be apparent to those skilled in the art from consideration of the specification and practice of the invention disclosed herein. Various aspects and/or components of the described embodiments may be used singly or in any combination. It is intended that the specification and examples be considered as exemplary only, with a true scope and spirit of the invention being indicated by the following claims.

The invention claimed is:

1. An ion detector comprising:
  an electron emission plate coupled to a first electrical potential and configured to emit electrons upon incidence on ions;
  a scintillator coupled to a second electrical potential, different from the first electrical potential, the scintillator having a front side facing the electron emission plate and a backside, the scintillator configured to emit photons from the backside upon incidence of electrons on the front side;
  a tubular lightguide optically coupled to the backside of the scintillator and confining flow of photons emitted from the backside of the scintillator;
  a photomultiplier coupled to the light guide and having an output configured to output
  electrical signal corresponding to incidence of photons from the lightguide;
  a first signal line coupled to the photomultiplier;
  a digital event counter configured to receive an input from the first signal line and provide a discrete event count output;
  a second signal line coupled to the photomultiplier independently of the first signal line;
  an analog integrator configured to receive input from the second signal line and provide integrated analog output simultaneously with the discrete event count output from the digital event counter.

2. The ion detector of claim 1, wherein the photomultiplier comprises a solid-state photomultiplier.

3. The ion detector of claim 2, wherein the solid-state photomultiplier comprises a silicon photomultiplier.

4. The ion detector of claim 2, wherein the solid-state photomultiplier comprises an array of avalanche photodiodes having outputs coupled together to provide a single electrical output signal.

5. The ion detector of claim 1, wherein the tubular lightguide comprises a reflective surface which directs the photons onto the photomultiplier.

6. The ion detector of claim 1, wherein the photomultiplier is coupled to a rear surface of the tubular lightguide.

7. The ion detector of claim 1, wherein:
the first signal line is coupled to an input bias line of the photomultiplier; and,
the second signal line is coupled to an output line of the photomultiplier.

8. The ion detector of claim 7, further comprising a transformer and wherein the first signal line is coupled to an input bias line through the transformer.

9. The ion detector of claim 7, further comprising a capacitor and wherein the first signal line is coupled to an input bias line through the capacitor.

10. The ion detector of claim 1, further comprising:
a tap connected to the electron emission plate; and,
a current measuring sensor connected to the tap.

11. An ion detector comprising:
an electron emission plate coupled to a first electrical potential and configured to emit electrons upon incidence on ions;
a scintillator coupled to a second electrical potential, different from the first electrical potential, the scintillator having a front side facing the electron emission plate and a backside, the scintillator configured to emit photons from the backside upon incidence of electrons on the front side;
a tubular lightguide optically coupled to the backside of the scintillator and confining flow of photons emitted from the backside of the scintillator;
a photomultiplier coupled to the light guide and having an output configured to output electrical signal corresponding to incidence of photons from the lightguide;
an electron multiplier;
a first signal line coupled to a dynode of the electron multiplier;
a digital event counter configured to receive an input from the first signal line and provide a discrete event count output;
a second signal line coupled to a collector of the electron multiplier;
an analog integrator configured to receive input from the second signal line and provide integrated analog output simultaneously with the discrete event count output from the digital event counter.

12. A secondary ion mass spectrometer, comprising:
an ion source providing a primary ion beam;
a secondary ion extractor collecting secondary ions sputtered from a sample by the primary ion beam;
beam forming optics receiving the secondary ions from the secondary ion extractor and forming a secondary ion beam;
a mass analyzer forming a trajectory onto a focal plane;
a plurality of ion detectors movably positioned along the focal plane;
wherein each of the ion detectors comprises:
a first section configured to emit electrons upon impingement of the secondary ions;
a second section configured to emit photons upon impingement of the electrons;
a third section configured to emit an electrical signal upon impingement of the photons; and,
a lightguide coupled on one end to the second section and on another end to the third section and confining trajectory of the photons.

13. The secondary ion mass spectrometer of claim 12, further comprising a spectrometer configured to allow only secondary ions within a desired band of mass-to-charge ratio to pass through.

14. The secondary ion mass spectrometer of claim 12, wherein the third section of each detector comprises a plurality of avalanche photodiodes having a common bias input line and a common output line.

15. The secondary ion mass spectrometer of claim 14, wherein:
the first section comprises an electron emission plate coupled to a first electrical potential and configured to emit electrons upon incidence on ions; and,
the second section comprises a scintillator coupled to a second electrical potential, different from the first electrical potential, the scintillator having a front side facing the electron emission plate and a backside, the scintillator configured to emit photons from the backside upon incidence of electrons on the front side.

16. The secondary ion mass spectrometer of claim 14, further comprising:
a digital event counter coupled to the common bias input line and configured to provide a discrete event count output; and,
an analog integrator coupled to the common output line and configured to provide integrated analog output simultaneously with the discrete event count output from the digital event counter.

17. The secondary ion mass spectrometer of claim 16, wherein the digital event counter is coupled to the common bias input line through a capacitor or a transformer.

18. The secondary ion mass spectrometer of claim 12, wherein the third section comprises a solid-state photomultiplier coupled to the light guide and having an output configured to output electrical signal corresponding to incidence of photons from the lightguide.

19. The secondary ion mass spectrometer of claim 12, wherein the third section comprises an electron multiplier and further comprising: a digital event counter coupled to a dynode of the electron multiplier and configured to provide a discrete event count output; and, an analog integrator coupled to a collector of the electron multiplier and configured to provide integrated analog output simultaneously with the discrete event count output from the digital event counter.

* * * * *